United States Patent
Cron et al.

(10) Patent No.: US 9,193,376 B2
(45) Date of Patent: Nov. 24, 2015

(54) FIXING DEVICE FOR AN ADJUSTABLE STEERING COLUMN FOR A MOTOR VEHICLE

(75) Inventors: Konstantin Cron, Ruethi (CH); Simon Blaettler, Altstaetten (CH); Hieronymus Schnitzer, Ruggell (LI); Martin Rohr, Hard (AT)

(73) Assignee: Thyssenkrupp Presta Aktiengesellschaft, Eschen (LI)

( * ) Notice: Subject to any disclaimer, the term of this patent is extended or adjusted under 35 U.S.C. 154(b) by 0 days.

(21) Appl. No.: 14/357,834

(22) PCT Filed: May 23, 2012

(86) PCT No.: PCT/AT2012/000143
§ 371 (c)(1),
(2), (4) Date: Jun. 4, 2014

(87) PCT Pub. No.: WO2013/071317
PCT Pub. Date: May 23, 2013

(65) Prior Publication Data
US 2014/0318305 A1 Oct. 30, 2014

(30) Foreign Application Priority Data
Nov. 16, 2011 (DE) .......................... 10 2011 055 410

(51) Int. Cl.
*B62D 1/184* (2006.01)
*B62D 1/18* (2006.01)
(Continued)

(52) U.S. Cl.
CPC *B62D 1/18* (2013.01); *B62D 1/184* (2013.01); *F16H 51/00* (2013.01); *F16H 53/00* (2013.01); *F16H 57/0006* (2013.01); *Y10T 74/20612* (2015.01); *Y10T 74/2101* (2015.01)

(58) Field of Classification Search
CPC .......... B62D 1/184; B62D 1/185; B62D 1/18; B62D 1/16; F16F 7/06; F16F 7/02
USPC .................. 74/493, 492, 567; 280/775
See application file for complete search history.

(56) References Cited

U.S. PATENT DOCUMENTS

| | | |
|---|---|---|
| 5,088,767 A | 2/1992 | Hoblingre et al. |
| 5,394,767 A | 3/1995 | Hoblingre et al. |

(Continued)

FOREIGN PATENT DOCUMENTS

| | | |
|---|---|---|
| DE | 31 38 083 | 6/1982 |
| DE | 695 00 927 | 4/1998 |

(Continued)

OTHER PUBLICATIONS

International Search Report (ISR) issued Sep. 19, 2012 in International (PCT) Application No. PCT/AT2012/000143.

(Continued)

*Primary Examiner* — Keith Frisby
(74) *Attorney, Agent, or Firm* — Wenderoth, Lind & Ponack, L.L.P.

(57) ABSTRACT

A fixing device for an adjustable steering column for a motor vehicle includes a first cam carrier having one or more cams fixedly attached thereto, and at least one further cam carrier having one or more cams fixedly attached thereto. The cam carriers are arranged such as to be rotatable relative to each other about a rotational axis. Upon rotation of the cam carriers relative to each other about the rotational axis, the cam or cams of the first cam carrier interact with the cam or cams of the further cam carrier such as to slide exclusively along each other. The fixing device includes at least one energy-consuming damping device which damps the rotation of the cam carrier in at least one direction of rotation about the rotational axis.

11 Claims, 1 Drawing Sheet

(51) Int. Cl.
*F16H 51/00* (2006.01)
*F16H 53/00* (2006.01)
*F16H 57/00* (2012.01)

(56) References Cited

U.S. PATENT DOCUMENTS

| | | | |
|---|---|---|---|
| 5,503,431 A | 4/1996 | Yamamoto | |
| 5,596,907 A | 1/1997 | Barton | |
| 5,598,741 A | 2/1997 | Mitchell et al. | |
| 5,787,759 A | 8/1998 | Olgren | |
| 6,089,780 A | 7/2000 | Lutz | |
| 6,092,957 A | 7/2000 | Fevre et al. | |
| 6,095,012 A | 8/2000 | Lutz | |
| 6,173,822 B1 | 1/2001 | Korb et al. | |
| 6,860,669 B2 | 3/2005 | Laisement et al. | |
| 7,010,996 B2 | 3/2006 | Schick et al. | |
| 8,997,602 B2 | 4/2015 | Tanaka | |
| 2002/0062518 A1 | 5/2002 | Hellwig et al. | |
| 2003/0052502 A1* | 3/2003 | Schmidt et al. | 296/37.13 |
| 2005/0178231 A1 | 8/2005 | Schick et al. | |
| 2006/0273567 A1 | 12/2006 | Fix | |
| 2008/0143092 A1 | 6/2008 | Menjak et al. | |
| 2008/0185829 A1 | 8/2008 | Senn | |
| 2008/0229867 A1 | 9/2008 | Waibel et al. | |
| 2009/0013817 A1 | 1/2009 | Schnitzer et al. | |
| 2009/0020995 A1 | 1/2009 | Kim | |
| 2011/0064538 A1 | 3/2011 | Oertle et al. | |
| 2011/0156380 A1 | 6/2011 | Dietz et al. | |
| 2011/0290605 A1 | 12/2011 | Krawczyk et al. | |
| 2012/0144953 A1 | 6/2012 | Schnitzer | |
| 2012/0285286 A1 | 11/2012 | Schnitzer et al. | |
| 2013/0104688 A1 | 5/2013 | Okada et al. | |
| 2013/0174684 A1 | 7/2013 | Burns | |

FOREIGN PATENT DOCUMENTS

| | | |
|---|---|---|
| DE | 197 18 031 | 8/1998 |
| DE | 198 05 289 | 8/1998 |
| DE | 197 45 038 | 7/1999 |
| DE | 100 51 805 | 5/2002 |
| DE | 102 25 089 | 1/2003 |
| DE | 101 61 849 | 6/2003 |
| DE | 10 2006 024 749 | 12/2006 |
| DE | 10 2005 052 123 | 1/2007 |
| DE | 10 2005 043 988 | 3/2007 |
| DE | 10 2005 045 365 | 3/2007 |
| DE | 20 2005 021 095 | 5/2007 |
| DE | 10 2007 003 091 | 8/2008 |
| DE | 10 2008 011 618 | 7/2009 |
| DE | 10 2008 028 460 | 12/2009 |
| DE | 10 2008 024 405 | 1/2010 |
| DE | 10 2008 045 143 | 3/2010 |
| DE | 696 10 067 | 4/2011 |
| DE | 10 2009 055 973 | 6/2011 |
| DE | 10 2010 029 252 | 12/2011 |
| DE | 10 2011 054 196 | 12/2012 |
| EP | 0 592 278 | 4/1994 |
| EP | 0 600 700 | 6/1994 |
| EP | 0 782 951 | 7/1997 |
| EP | 0 802 104 | 10/1997 |
| EP | 1 110 843 | 6/2001 |
| EP | 1 747 967 | 1/2007 |
| EP | 1 795 425 | 6/2007 |
| EP | 1 870 309 | 12/2007 |
| EP | 2 003 364 | 12/2008 |
| EP | 2 431 257 | 3/2012 |
| FR | 2 802 166 | 6/2001 |
| FR | 2 822 782 | 10/2002 |
| FR | 2 834 680 | 7/2003 |
| GB | 2 087 808 | 6/1982 |
| JP | 2-92779 | 4/1990 |
| JP | 2000-16303 | 1/2000 |
| JP | 2005-193745 | 7/2005 |
| JP | 2008-230452 | 10/2008 |
| JP | 2010-184656 | 8/2010 |
| WO | 96/15931 | 5/1996 |
| WO | 2007/009576 | 1/2007 |
| WO | 2009/105798 | 9/2009 |
| WO | 2011/020538 | 2/2011 |
| WO | 2012/011424 | 1/2012 |
| WO | 2013/050095 | 4/2013 |
| WO | 2013/097922 | 7/2013 |
| WO | 2013/107486 | 7/2013 |
| WO | 2013/143635 | 10/2013 |

OTHER PUBLICATIONS

International Search Report issued May 13, 2013 in International Application No. PCT/EP2013/000424.

International Search Report issued Mar. 27, 2013 in International Application No. PCT/EP2012/005194.

* cited by examiner

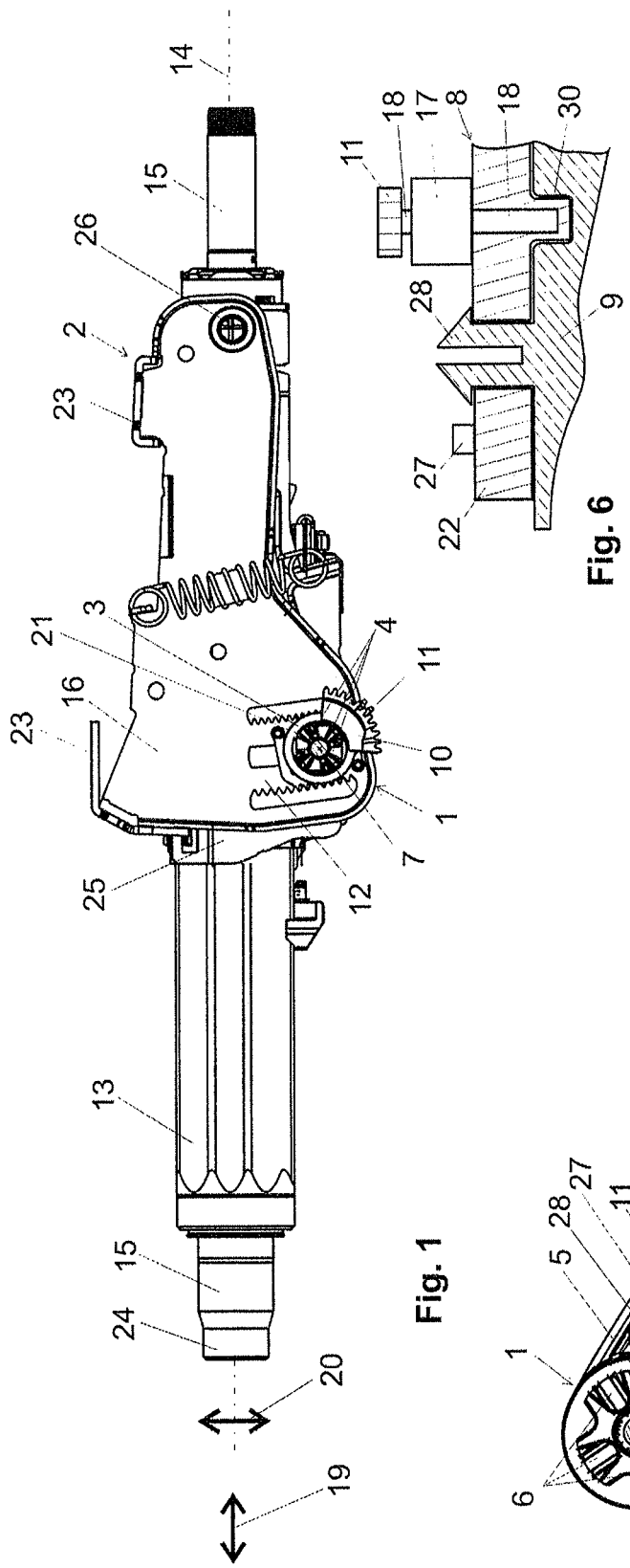
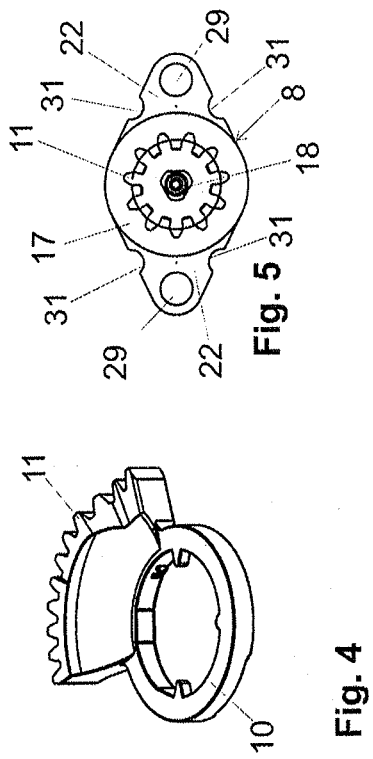
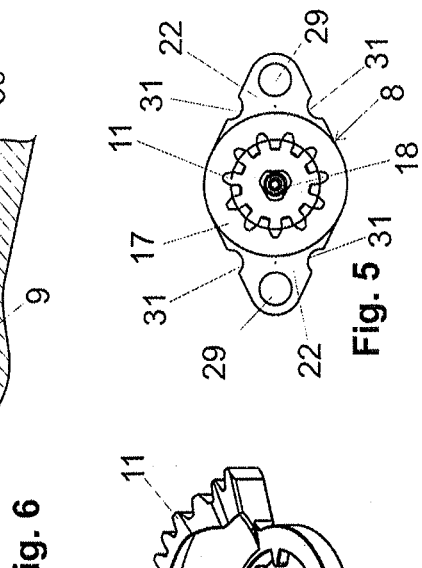
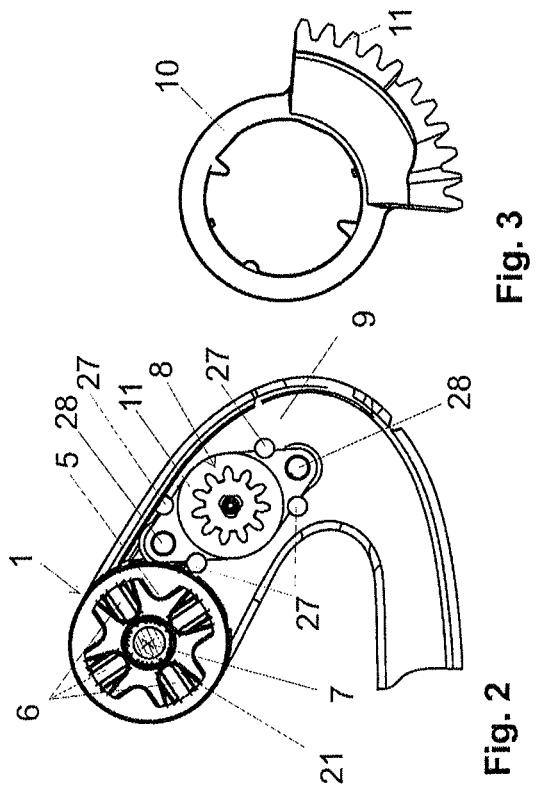

FIXING DEVICE FOR AN ADJUSTABLE STEERING COLUMN FOR A MOTOR VEHICLE

BACKGROUND OF THE INVENTION

The present invention relates to a fixing device for an adjustable steering column for a motor vehicle. The fixing device has a first cam carrier with one or more cams which are fastened fixedly thereto, and at least one further cam carrier with one or more cams which are fastened fixedly thereto. The cam carriers are arranged such that they can be rotated relative to one another about a rotational axis. During the rotation of the cam carriers relative to one another about the rotational axis, the cam or the cams of the first cam carrier interacting with the cam or the cams of the further cam carrier such that they slide exclusively along one another.

Cam-controlled fixing devices of the generic type for adjustable steering columns are known in a multiplicity of embodiments in the prior art. In fixing devices of the generic type, the cams are fastened fixedly on the cam carrier. The cams are usually configured in one piece with the base of the cam carrier. As a result of rotation of the cam carriers about the rotational axis, the cams of the cam carriers which correspond with one another slide along one another. As a result of the rotation and the design of the cams, a stroke occurs here in the longitudinal direction of the rotational axis, as a result of which the fixing device is moved from an open position into a closed position or vice versa. The range, in which the cams can be rotated with respect to one another, the rotating range, is delimited by the rotational position of the two cams in the open position and the rotational position of the two cams in the closed position. In the open position, the adjustable steering column can be adjusted in order to adapt the position of the steering wheel to the respective driver. In the closed position of the fixing device, the position of the steering wheel is fixed.

A fixing device of the generic type is known, for example, from EP 1 795 425 A2. There, elastic tongues are provided which serve to stress the two cam carriers elastically onto one another in order to reduce the play in the axial direction of the rotational axis.

In fixing devices of the generic type, the cams move exclusively slidingly along one another. A rolling movement or the like therefore does not occur. As a result of the cams sliding along one another of the participating cam carriers, a certain damping action of the movement during rotation of the cam carriers with respect to one another already automatically occurs in fixing devices of the generic type.

SUMMARY OF THE INVENTION

It is an object of the invention, in a fixing device of the generic type, to make further equalization of the movement possible between the open position and closed position and/or in the opposite direction.

According to the invention, this is achieved by way of a fixing device as described below.

It is therefore provided that the fixing device has at least one energy-absorbing damping device which damps the rotation of the cam carriers in at least one rotational direction about the rotational axis.

By way of the energy-absorbing damping device, the rotary or rotational speed of the cam carriers during rotation with respect to one another is reduced.

Clanking or rattling of the fixing device during the movement is reduced as a result. This results overall in a uniform movement in the fixing device, which movement is pleasant for the user.

It is favorably provided that the damping device has a speed-dependent damping function. In other words, it is therefore preferably provided that the damping device damps to a different extent at different rotational speeds about the rotational axis. It can thus be provided, for example, that the braking effect is particularly pronounced during a rapid rotation of the cam carriers with respect to one another, whereas the braking action is smaller during a slow rotation. At any rate, complete opening of the fixing device can be aided.

In one preferred embodiment, the damping device is configured in such a way that the damping action of the damping device is active, at least in one rotational direction, for at least half of the possible rotational range of the rotation of the cam carriers relative to one another. It is particularly to be preferred here that the damping action is active, at least in one rotational direction, for at least two thirds, or even more, preferably for at least three quarters, of the possible rotational range. A damping action over the entire rotational range is not required, however, since there is already damping solely by way of the cam control in the range of high stressing force as a result of the resulting high frictional forces. It can thus preferably be provided to reduce or completely suppress the damping action of the damping device for the rotational range, in which the stressing forces of the fixing device assume values which are greater than or equal to three quarters of the maximum provided stressing force of the fixing device.

A pronounced acceleration of the actuating lever, in particular during opening, can be prevented by way of the damping which acts over a large rotational range, with the result that increased vibrations and/or contact impacts during opening are reduced.

Preferred embodiments of a fixing device according to the invention provide that the damping device damps the rotation of the cam carriers relative to one another in one of the rotational directions about the rotational axis to a more pronounced extent than in the opposite rotational direction with respect thereto. For example, it is conceivable and possible in this context that the damping device has a freewheel in one of the rotational directions about the rotational axis. Particularly preferred embodiments of the invention provide that the energy-absorbing damping device acts only during opening but not during closing of the fixing device. In other words, the damping device damps exclusively during a rotation of the cam carriers relative to one another from a closed position of the fixing device into an open position of the fixing device, the fixing device permitting, in its open position, the adjustment of two components of the steering column relative to one another and suppressing the adjustment in its closed position. The two components of the steering column which can be adjusted with respect to one another can be, for example, a steering spindle bearing unit for rotatably mounting a steering spindle and a bracket unit for fastening the steering column to the motor vehicle.

However, there does not necessarily have to be a freewheel in the closing direction. In a deviation, the damping device damps the rotation during a rotation of the cam carriers relative to one another from the closed position of the fixing device into the open position of the fixing device to a greater extent than the rotation in the opposite direction.

The cams form a type of ridge system on the cam carriers, which ridge system protrudes beyond the base of the cam carrier. It is known to provide the desired activation and clamping forces, for example, via a corresponding shaping of the steepness of the flanks of the cams. The cams favorably protrude from a corresponding base of the respective cam carrier in the direction parallel to the rotational axis. Each cam carrier has at least one cam, but as a rule also a plurality of cams. The cam carriers or their base can have a disk-shaped configuration. The base then also forms the depressions or valleys between the cams which form the ridge system. In the operating position, the cams of the first cam carrier and those of the further cam carrier are favorably directed toward one another.

The damping device which is used according to the invention is an energy-absorbing damping device. This means that energy is consumed or destroyed and not stored during the damping operation. The energy which is consumed by the damping device is usually converted into heat and can no longer be returned into the fixing device as kinetic energy. This distinguishes the energy-absorbing damping devices according to the invention even from elastic spring elements or the like. Although a braking effect can also be achieved via spring elements of this type in a corresponding design, the energy which is removed during the breaking is stored, however, as elastic deformation by the spring elements which are different than the generic type, and is returned later at least partially into the system again. However, the return of the energy into the system increases the vibration inclination and therefore the risk of rattling of the actuating lever during opening and/or closing of the fixing device. An energy return of this type is not possible in the energy-absorbing damping device which is used according to the invention.

It has been shown surprisingly that energy-absorbing damping devices which are known from the construction of fittings for the furniture industry can be used for fixing devices according to the invention. For example, they can be fluid dampers which are known per se. In this context, preferred variants of the fixing device according to the invention provide that the damping device has at least two damper components which can be moved relative to one another and at least one damping fluid. The damping fluid is arranged or acts between the damper components which move relative to one another in order to damp the damper components. Damping devices of this type are known as linear dampers and also as rotation dampers in the abovementioned production of furniture fittings. Preferably, the damping device is a rotation damper or has a rotation damper of this type.

In rotation dampers of this type, the first damper component can be, for example, a housing of the rotation damper. The second of the damper components which can be moved relative to one another can then be a rotor which is mounted rotatably in the housing. The energy-absorbing damping action takes place in the damping fluid which acts or is arranged between the rotor and the housing. The damping fluid can be liquids, such as oils, silicone or more highly viscous materials. However, air or another gas can also be used as damping fluid. The energy-absorbing damping action takes place by way of displacement of the damping fluid or by the damping fluid being pressed through suitably shaped throttle points and the like. A multiplicity of suitable dampers of this type is known in the prior art.

Preferred embodiments of fixing devices according to the invention provide that the fixing device has an actuating lever which is mounted such that it can be pivoted about the rotational axis, and that the damping device or an activation apparatus which interacts with the damping device during the damping operation is fastened to the actuating lever. The actuating lever can be, for example, a lever of the fixing device, which lever is known per se, can be actuated by hand and is actuated by the driver, in order to move the fixing device from its open position into its closed position and/or in the reverse direction.

The damping device and the activation apparatus can interact with one another via toothing systems. For example, interaction of a toothed rack which is optionally of curved or bent configuration with a gearwheel is conceivable. The gearwheel can be part of the damping device. Preferred embodiments thus provide, for example, that a rotor of the damping device carries a gearwheel. The latter can then interact with a toothed rack of the activation apparatus, which toothed rack is optionally of curved or bent configuration. Preferred refinements of the fixing device according to the invention provide that the fixing device has a carrier which is stationary with regard to the steering column, and the actuating lever can be rotated relative to the carrier about the rotational axis, the damping device being fastened to the actuating lever and the activation apparatus being fastened to the carrier or vice versa. It can also be provided that one of the cam carriers is fixed on the carrier which is stationary with regard to the steering column, whereas the other of the cam carriers is connected fixedly to the actuating lever so as to rotate with it. In this context, particularly preferred embodiments of fixing devices according to the invention provide a stressing bolt which is preferably oriented coaxially with respect to the rotational axis of the cam carriers. The cam carriers can be arranged on the clamping bolt. The same applies to the actuating lever. The carrier which is stationary with regard to the steering column can be configured as part of a bracket part of the steering column. The bracket part serves to fasten the steering column to the body of the vehicle.

The damping device preferably has two fixing brackets which are fixed in each case between two fastening clips by way of a press fit on the actuating lever. For securing, the fixing brackets can have through openings, through which a latching clip is guided and clipped, as a result of which an additional captive securing means is formed for the damping device. The fastening clips and/or the latching clips can in each case be parts of the actuating lever or can be formed integrally thereon.

In addition to the fixing device per se, the invention also relates to a steering column for a motor vehicle having a fixing device according to the invention, it being provided that the steering column has a steering spindle bearing unit, a steering spindle which is mounted in the steering spindle bearing unit such that it can be rotated about its longitudinal axis, and a bracket part, the steering spindle bearing unit being mounted on the bracket part with the use of the fixing device, and the steering spindle bearing unit being adjustable relative to the bracket part along the longitudinal axis of the steering spindle and/or in a direction transversely with respect thereto in an open position of the fixing device and being fixed in its position relative to the bracket part in a closed position of the fixing device. Adjustable steering columns according to the invention can therefore be length-adjustable and/or height-adjustable steering columns.

BRIEF DESCRIPTION OF THE DRAWINGS

By way of example, the figures show a steering column according to the invention having a fixing device according to the invention. In the drawings:

FIG. 1 shows a side view of the steering column according to the invention with a removed actuating lever, FIG. 2 shows a part view of the actuating lever, FIGS. 3 and 4 show views of the activation apparatuses, FIG. 5 shows a plan view of the energy-absorbing damping device which is used according to the invention, and FIG. 6 shows an illustration of the fastening of the damping device to the actuating lever, partially in section.

DETAILED DESCRIPTION OF THE INVENTION

The general construction of the steering column 2 according to the invention having the fixing device 1 according to the invention will first of all be explained using the side view according to FIG. 1. The steering column 2 has a bracket part 16 which can be fastened by means of the fastening brackets 23 to a body (not shown here) of the motor vehicle. An intermediate part 25 is arranged on the bracket part 16 via the pivoting joint 26. A vertical adjustment in the vertical adjusting direction 20 can be achieved by pivoting the intermediate part 25 relative to the bracket part 16 about the pivoting joint 26. The steering spindle bearing unit 13 is mounted in the intermediate part 25. The steering spindle bearing unit 13 can therefore be displaced along the longitudinal axis 14 of the steering spindle 15 in the longitudinal adjusting directions 19 relative to the intermediate part 25 and therefore to the bracket part 16. In the exemplary embodiment which is shown, both vertical and longitudinal adjustment is therefore possible. Apart from the case of a crash, however, an adjusting possibility therefore exists in normal operation only when the fixing device 1 is situated in its open position. If the fixing device 1 is situated in its closed position, the position of the steering spindle bearing unit 13 relative to the bracket part 16 and therefore relative to the body of the vehicle is fixed.

In the steering spindle bearing unit 13, the steering spindle 15 is mounted such that it can be rotated about its longitudinal axis 14. The steering wheel (not shown here) can be fastened to the steering wheel connection 24 of the steering spindle 15. In its closed position, the fixing device 1 can ensure corresponding fixing of the steering spindle bearing unit 13 relative to the bracket part 16 by means of a positively locking connection and/or, however, also by means of a frictional connection or non-positive connection. Corresponding positively locking and/or non-positive clamping systems are known in the prior art.

The fixing device 1 which is shown here has a clamping bolt 21 which is known per se but is only shown in section here. The clamping bolt 21 is guided through the bracket part 16 in the direction perpendicular with respect to the plane of the drawing according to FIG. 1 and is held on the bracket part 16 by means of a nut or the like on an opposite side of the bracket part 16, which side is not visible here. The first cam carrier 3 with its cams 4 is arranged on the clamping bolt 21 on the visible side. The additional cam carrier 5 including its cams 6 and the actuating lever 9 is removed in FIG. 1 and is shown separately in FIG. 2. In the finally assembled position, the two cam carriers 3 and 4 are arranged on the clamping bolt 21 in such a way that they can be rotated relative to one another about the rotational axis 7 and, during rotation of the cam carriers 3 and 5 relative to one another about the rotational axis 7, the cams 4 of the first cam carrier 3 interact with the cam or the cams 6 of the further cam carrier 4 such that they slide along one another.

Here, on account of the fixed fastening of the cams 4 and 6 on the respective cam carrier 3 and 5, it is exclusively a sliding movement, for the case where the cams of the two cam carriers which can be rotated with respect to one another are in contact. Rolling or the like therefore does not occur. In the exemplary embodiment which is shown, the first cam carrier 3 is held fixedly on a carrier 12, so as to rotate with it, which carrier 12 is stationary with regard to the steering column 2 or the bracket part 16. In contrast, the second or further cam carrier 5 is integrated into the actuating lever 9 in a rotationally fixed manner. As a result, during pivoting of the actuating lever 9 about the rotational axis 7 which is arranged coaxially with respect to the clamping bolt 21, the cam carriers 3 and 5 are rotated relative to one another about the rotational axis 7. As a result, by way of the corresponding interaction of their cams 4 and 6, a stroke occurs in the longitudinal direction of the rotational axis 7, as a result of which, depending on the stroke direction, as known per se, stressing or closing or relieving or opening of the fixing device 1 occurs. In the closed position of the fixing device 1, the stroke causes the steering spindle bearing unit 13 to be fixed in its position on the bracket part 16. In the open position of the fixing device 1, the adjusting possibilities which have already been mentioned at the outset are available.

In order to equalize the movement of the fixing device 1, the fixing device 1 comprises, according to the invention, an energy-absorbing damping device 8 which is fastened to the actuating lever 9 in the exemplary embodiment which is shown. The fastening preferably takes place by the damping device 8 being fitted in the region of the damper component 18 into a depression 30 in the actuating lever 9. This is intended to avoid the walls of the depression 30 transmitting stresses to the assembly comprising the damper components 17, 18. The fastening takes place by way of fastening clips 27 which are applied with a press fit to engagement sections 31 which are arranged on the fixing brackets 22. In order to secure the connection, two latching clips 28 are additionally provided which penetrate openings 29 in the fixing brackets 22 and are clipped with an undercut on the fixing brackets. As configured in the example, the latching clips 28 are preferably connected integrally to the actuating lever 9, for example by being formed directly during the injection molding process for the actuating lever. Since the fixing brackets are arranged spaced apart from the assembly of the damper components 17, 18, no forces or, however, only negligibly low forces are transmitted from the fastening of the damping device 8 to the assembly consisting of the damper components 17, 18. The damping device 8 is therefore functionally capable and an inexpensive fastening method is realized. The fastening clips 27 are preferably likewise connected integrally to the actuating lever 9, once again are preferably also already formed directly during the injection molding process of the actuating lever. In the case of an alternative arrangement of the damping element 8 on the carrier, a comparable fastening is conceivable and possible. A fastening clip 27, a latching clip 28 and the depression 30 can be seen clearly in the partially sectioned illustration of FIG. 6. The damper components 17, 18 are not shown in section, but rather only in a greatly diagrammatic manner. They can be configured as known in the prior art.

In the exemplary embodiment which is shown, the activation apparatus 10 which interacts with the energy-absorbing damping device 8 is fastened in a rotationally fixed manner to the carrier 12 and therefore to the bracket part 16. In the exemplary embodiment which is shown, both the energy-absorbing damping device 8 and the activation apparatus 10 in each case have a toothing system 11, by way of which they interact. In the exemplary embodiment which is shown, the toothing system 11 of the damping device 8 is configured as a gearwheel. In the variant which is shown, the toothing system 11 of the activation apparatus 10 is configured as a bent toothed rack.

For the sake of completeness, it is noted that other embodiments according to the invention are of course also conceivable. It is thus possible, for example, that the energy-absorbing damping device 8 is fastened to the carrier 12 or bracket part 16, whereas the activation apparatus 10 is arranged fixedly on the lever 9. Other types of configuration of toothing systems 11 are also possible. Moreover, it is also conceivable, for example, that the damping device 8 according to the invention is not configured, as shown here, as a rotation damper, but rather, for example, as a linear damper or as a combination of linear and rotation damper. In principle, all types of energy-absorbing damping devices which are known in the prior art and are suitable for the application can be used.

In the exemplary embodiment which is shown, the engagement of the toothing systems 11 of the damping device 8 and the activation apparatus 10 into one another leads at any rate to the desired damping effect occurring during pivoting of the actuating lever 9 about the rotational axis 7. In principle, the damping can be provided in both directions. As already explained at the outset, it can be speed-dependent. Moreover, it can also be provided that a higher damping action is achieved in one rotational direction than in the other. Displacement-dependent damping profiles can also be provided. All of this is possible, for example, by way of a suitable embodiment of the corresponding damping device 8. It is particularly preferably provided at any rate that the damping device 8 has a freewheel in one of the rotational directions about the rotational axis 7. In this context, it is provided in particularly preferred variants that the damping device 8 acts only, that is to say exclusively, during a rotation of the fixing device from its closed position into its open position. As an alternative, it can also be provided that the damping device at least acts to a more pronounced extent during this rotation than during the rotation in the opposite direction.

FIG. 5 once again shows a plan view of the energy-absorbing damping device 8 which is used in this exemplary embodiment in the form of a rotation damper. FIG. 5 shows the rotation damper detached from the actuating lever 9. First of all, the two fixing brackets 22 can be seen, by way of which the damping device 8 can be fastened to the actuating lever 9 or, as an alternative, can optionally also be fastened to the carrier 12 or to the bracket part 16. The damping device 8 according to FIG. 5 has two damper components 17 and 18. The damper component 17 is a housing, to which the fixing brackets 22 are also fastened in the exemplary embodiment which is shown. The second damper component 18 is a rotor which is mounted rotatably in the damper component 17, that is to say in the housing of the damping device 8. A damping fluid which is usually not visible from the outside acts between the two damper components 17 and 18, in order to achieve the desired energy-absorbing damping. Suitable damping devices 8, in particular in the form of rotation dampers, are known, as already explained at the outset, in a multiplicity of embodiments with or without freewheel from the construction of fitting parts for furniture, with the result that a detailed illustration of the inner construction of the damping device 8 is unnecessary.

LIST OF DESIGNATIONS

1 Fixing device
2 Steering column
3 First cam carrier
4 Cam
5 Further cam carrier
6 Cam
7 Rotational axis
8 Damping device
9 Actuating lever
10 Activating apparatus
11 Toothing system
12 Carrier
13 Steering spindle bearing unit
14 Longitudinal axis
15 Steering spindle
16 Bracket part
17 Damper component
18 Damper component
19 Longitudinal adjusting direction
20 Vertical adjusting direction
21 Clamping bolt
22 Fixing brackets
23 Fastening brackets
24 Steering wheel connection
25 Intermediate part
26 Pivoting joint
27 Fastening clip
28 Latching clip
29 Opening
30 Depression
31 Engagement section

The invention claimed is:

1. A fixing device for an adjustable steering column for a motor vehicle, the fixing device comprising:
a first cam carrier with one or more cams which are fastened fixedly thereto; and
a second cam carrier with one or more cams fastened fixedly thereto,
wherein the first and second cam carriers are arranged to be rotatable relative to one another about a rotational axis such that during rotation of the cam carriers relative to one another about the rotational axis, the one or more cams of the first cam carrier interacts with the one or more cams of the second cam carrier such that they move only by sliding along one another, causing a stroke in a longitudinal direction of the rotational axis,
and wherein the fixing device has an energy-absorbing damping device configured to damp the rotation of the cam carriers in at least one rotational direction about the rotational axis.

2. The fixing device as claimed in claim 1, wherein the damping action of the damping device is active, at least in one rotational direction, for at least two thirds of the possible rotational range of the rotation of the first and second cam carriers relative to one another.

3. The fixing device as claimed in claim 1, wherein the damping device is configured to damp the rotation of the first and second cam carriers relative to one another in one rotational direction about the rotational axis to a more pronounced extent than in an opposite rotational direction with respect thereto.

4. The fixing device as claimed in claim 3, wherein the damping device is configured to damp exclusively during a rotation of the first and second cam carriers relative to one another from a closed position of the fixing device into an open position of the fixing device or to damp to a more pronounced extent during the rotation from the closed position of the fixing device into the open position than during a rotation in the opposite direction, the fixing device being configured to permit, in the open position, adjustment of two components of the steering column relative to one another and to suppress adjustment in the closed position.

5. The fixing device as claimed in claim 1, wherein the damping device has a freewheel in one rotational direction about the rotational axis.

6. The fixing device as claimed in claim 1, wherein the damping device has at least two damper components configured to be moved relative to one another and at least one damping fluid, the damping fluid being arranged or acting between the damper components to be moved relative to one another in order to damp the damper components.

7. The fixing device as claimed in claim 1, wherein the damping device is a rotation damper or has a rotation damper.

8. The fixing device as claimed in claim 1, further comprising:
- an actuating lever mounted such that the actuating lever is pivotable about the rotational axis; and
- an activation apparatus interacting with the damping device during the damping operation,
- wherein the damping device or the activation apparatus is fastened to the actuating lever.

9. The fixing device as claimed in claim 8, wherein the damping device and the activation apparatus interact via toothing systems.

10. The fixing device as claimed in claim 8, further comprising a carrier which is stationary relative to the steering column, wherein the actuating lever is rotatable relative to the carrier about the rotational axis, and wherein the damping device is fastened to the actuating lever and the activation apparatus is fastened to the carrier, or the damping device is fastened to the carrier and the activation apparatus is fastened to the actuating lever.

11. A steering column for a motor vehicle having a fixing device as claimed in claim 1, wherein the steering column has a steering spindle bearing unit, a steering spindle having a longitudinal axis mounted in the steering spindle bearing unit such that the steering spindle is rotatable about the longitudinal axis, and a bracket part,
- the steering spindle bearing unit being mounted on the bracket part via the fixing device, and the steering spindle bearing unit being adjustable relative to the bracket part along the longitudinal axis of the steering spindle or in a transverse direction with respect to the longitudinal axis in an open position of the fixing device, and being fixed in position relative to the bracket part in a closed position of the fixing device.

\* \* \* \* \*